Sept. 29, 1964 J. W. WENNER 3,150,939
HIGH DENSITY RECORD CARRIER
Filed July 17, 1961
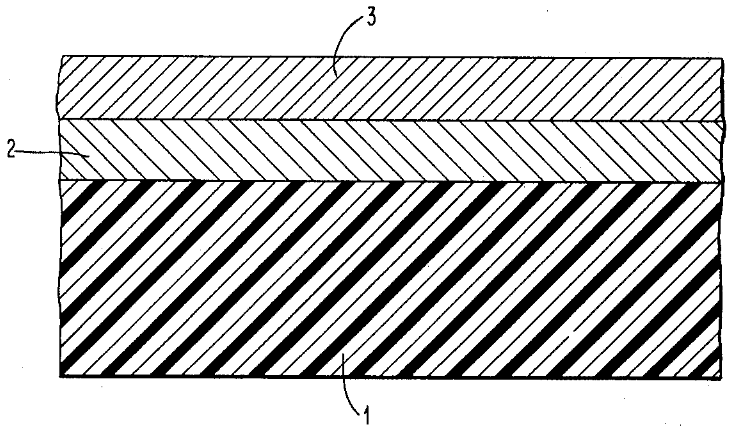
INVENTOR
JOHN W. WENNER
BY Bertram M. Mullin
ATTORNEY United States Patent Office 3,150,939

Patented Sept. 29, 1964

3,150,939

HIGH DENSITY RECORD CARRIER

John W. Wenner, Poughkeepsie, N.Y., assignor to International Business Machines Corporation, New York, N.Y., a corporation of New York Filed July 17, 1961, Ser. No. 124,498

3 Claims. (Cl. 29—195)

This invention relates to an improved carrier for the translation of data in data processing and computer machines. More particularly, this invention relates to an improved record carrier having a magnetic recording medium on a surface thereof for the translation and storage of data thereon.

In the data processing and computer fields, it is well known to use translating magnetic surfaces such as tapes, discs, drums and the like as record carriers for the storage of data and other information. Data is recorded on these carriers by selectively magnetizing designated ones of a group of spots along a surface thereof, the magnetizing fields being induced by electrical signals in which the parameters of amplitude, polarity and time are varied to represent intelligence. The recorded data is retrieved by inducing electrical signals with the magnetization patterns recorded at the designated spots along the magnetic surface of the record carrier.

With magnetic recording, it is possible to store large quantities of information inexpensively over long periods of time without data decay on a record carrier such as tape. Tape is a desirable and reliable record carrier except for the factor of access time (the time required to store and to retrieve information from the record surface) which severely limits the machines with which it is used from achieving higher and higher speeds. The access time required is several orders of magnitude higher than the computation speed of the machine. Attempts have been made to reduce the access time by storing information at greater densities on the recording medium, the approach being that the more information stored or sensed within a given time the less the total access time required for the operation at a particular tape speed. However, prior art magnetic recording tapes do not lend themselves to high density recording. As the bit density, the number of bits of information per unit length of tape, is increased in excess of 3000 bits per inch, the readback signal amplitude is reduced and the spacing of signal peaks is varied due to well-known high-speed phase shift.

Phase shift prevents the accurate sensing of information, increases errors and reduces tape reliability. Phase shift arises from a magnetization pattern representing intelligence at one data spot influencing intelligence stored at an adjacent data spot, and from the recorded magnetization being unevenly distributed through the depth of the recording medium. Owing to these phenomena, a magnetization pattern representing data at one spot along the recording medium may spread out and in some instances overlap adjacent magnetization patterns, giving rise to two sources of error on sensing.

One source for error arises from the failure of points along the recording surface to represent subsequent points in time in the original signal. In transferring intelligence contained in an electrical signal to a record carrier for storage, the recording surface is magnetized to a given amplitude in a given polarity at a given point to represent the electrical signal at one moment in time. Sensing is based on the amplitude and polarity of a magnetization pattern recorded at a given spot on the record surface being proportional to the same parameters at a given moment in time in the electrical signal. When the magnetization pattern spreads out along the recording surface, the relationship no longer holds, and accurate sensing is not possible. Furthermore, if a magnetization pattern spreads out to the extent that it overlaps an adjacent magnetization pattern, a second source for error is created. The overlapped portions form a resultant pattern which is not representative of the original data. On sensing, the resultant pattern may generate an electrical signal which may be taken for recorded data. As more and more data is crowded onto the medium the situation depicted is accentuated.

In order to provide a record carrier with nearly perfect reliability at high bit densities, it is necessary that a recorded magnetization pattern representing intelligence at a data spot on the recording medium be resistant to the influence of a magnetic field in proximity to the data spot. Magnetization patterns displaying this resistance provide clearly distinguishable output signals on readout, making accurate sensing possible.

It is, therefore, a primary object of this invention to provide a record carrier capable of storing information at high density without phase shift.

Among other objects of the invention are:

To provide a record carrier having a magnetic recording medium on the surface thereof having superior high density capabilities;

To provide a record carrier having a magnetic recording medium on a surface thereof having superior output signal characteristics;

To provide a record carrier having a magnetic recording medium on a surface thereof with a longer useful life;

To provide a record carrier having a magnetic recording medium on the surface thereof capable of being manufactured and maintained at low cost.

The invention relates to that type of record carrier wherein the recording medium is a layer of magnetizable metal. In accordance with the principle on which this invention is predicated, the magnetizable layer is characterized by a high coercivity and a high surface smoothness, the high coercivity making the data recorded on the recording medium as a magnetization pattern resistant to the influence of a magnetic field in proximity thereto. The high surface smoothness enables close proximity of the recorded magnetization pattern with a magnetic sensing device. The extremely smooth thin layer provides maximum resolution consistent with required signal output. With the record carrier of this invention, information recorded at high densities is sensed without significant phase shift, reduced signal amplitude, or reduced carrier reliability.

In accordance with the present invention, the superior properties of the record carrier are accompanied by a reduced tendency to accumulate electrostatic charge which is characteristic of the magnetizable metal type of tape. On those carriers on which the electrostatic charge tends to accumulate, the discharge of the electrostatic charges and the adhesive nature of these charges make it difficult to accurately record and sense data. The discharge of the accumulated charges usually occurs on the carrier transport, and this induces noise into the sensing and the detection circuits. The adhesive nature of the electrostatic charges causes erratic carrier acceleration and attract and hold foreign particles on the surface, and foreign particles cause surface wear, and obscure minute areas on the recording surface. These disadvantages are overcome by reducing the tendency to accumulate electrostatic charge.

Accordingly, a further feature of the present invention is to provide a record carrier having a reduced tendency to accumulate electrostatic charge, thereby making the accurate recording and sensing of data possible.

The foregoing and other objects, features and advantages of the invention will be apparent from the following more particular description of preferred embodiments of the invention as illustrated in the accompanying drawing.

The drawing is a diagrammatic cross-sectional view of a record carrier in accordance with this invention.

Briefly, in accordance with a preferred embodiment of the invention, a record carrier is provided by superimposing a magnetizable metal on a surface of a dielectric resin sheet, the resin sheet having metal atoms on the surface thereof. The magnetizable metal is provided with a surface characterized by a roughness no greater than 4 microinches peak to peak so that the recorded magnetization is uniformly distributed through the depth of the metal and is further provided with a coercivity of at least 375 oersteds so that an increment of data recorded at a spot on the surface is resistant to the influence of a magnetic field in proximity thereto. The metal atoms on the surface of the dielectric resin sheet provide nuclei for the bonding of the magnetizable metal to the carrier. In accordance with the present invention a record carrier is provided with superior high density capabilities heretofore not known.

Referring to the drawing, the diagrammatic cross-sectional view of record carrier in accordance with this invention shows a carrier portion 1, a source of bonding nuclei 2 superimposed on a surface of the carrier 1, and a magnetic recording medium 3 superimposed on the source of bonding nuclei 2. Carrier portion 1 may be a dielectric resin sheet formed from a synthetic polyester resin and the bonding nuclei may be a layer of metal atoms; in the preferred embodiment of this invention, the atoms may be placed on the carrier 1 by metallizing the surface thereof by techniques more fully described hereafter. A magnetizable metal layer having a coercivity $H_c$ of at least 375 oersteds is superimposed on the metallized carrier surface to form the magnetic recording medium, the recording surface of the magnetizable layer having a roughness in the order of 2 to 4 microinches peak to peak. In the preferred embodiment of this invention, magnetizable layer 3 may be ferromagnetic material such as a cobalt or a cobalt base alloy while the metallized layer 2 may be formed from any metal that forms a metallized layer on the carrier with a surface having a roughness in the order of 2 to 4 microinches peak to peak and bonds the magnetizable layer to the carrier. A firm fused metal-to-resin bond is obtained between the magnetizable metal layer 3 and dielectric resin sheet 1, layer 2 acting as a cement between the magnetizable layer and the dielectric resin sheet.

Any of the various conventional methods such as vacuum evaporation, cathode sputtering, chemical (electroless) plating and electroplating may be used to make a record carrier in accordance with the present invention. For example, the metallized layer may be chemically plated onto a surface of the dielectric resin sheet, and the magnetizable metal layer electroplated onto the metallized layer. However, before a surface of a dielectric resin sheet such as the polymeric condensation product of terephthalic acid and ethylene glycol is metallized, it is first necessary to activate and sensitize the sheet surface. This may be done by washing a given length of sheet of about one mil thickness, and a half-inch in width in acetone and then immersing the sheet in boiling water for 15 minutes. The sheet may then be sensitized by immersing it in a solution of: 30 g./l. stannous chloride, 10 ml./l. hydrochloric acid (conc.) and the balance water. The sheet is rinsed in water and then immersed in another solution of: 0.1 g./l. palladium chloride, 10 ml./l. hydrochloric acid (conc.) and the balance water. The first solution is maintained at a temperature of about 25° C. and the second solution at a temperature between 55 to 60° C., and the immersion time in each of the respective solutions is between one to five seconds. After this treatment it is posible to metallize a surface of the dielectric resin sheet without the metal pitting or flaking from the surface.

Nickel, for example, may be chemically plated on the sheet surface by immersing the sheet in a solution of: 30 g./l. nickel(ous) chloride, 10 g./l. sodium hypophosphite, 50 g./l. ammonium chloride, 100 g./l. sodium citrate, 40 ml./l. ammonium hydroxide (28%) and the balance water. The nickel is deposited by the catalytic reduction of the nickel on the sheet surface. With the solution at a temperature between 90 to 95° C. and with a plating time between 70 to 90 seconds, a nickel layer between 6 to 8 microinches in thickness is produced. With the plating solution described, the nickel contains 7 to 10% phosphorus and has a specific surface resistance between 3.5 to 5.5 ohms/inch.

Since the nickel atoms provide a source of nuclei for bonding further metal particles to the sheet, it is possible to electroplate the magnetizable metal layer onto the metallized surface of the dielectric resin sheet. With an electroplating bath containing a solution of: 26.4 g./l. nickel(ous) sulfate, 28.2 g./l. cobalt(ous) sulfate, 4.2 g./l. sodium hypophosphite, 27.0 g./l. ammonium chloride and the balance water, a cobalt base alloy is deposited on the metallized surface. The alloy provides a recording surface having a roughness between 2 to 4 microinches peak to peak.

In the electroplating process, the metallized sheet is exposed to the electroplating bath as the cathode and the process is made continuous by causing the metallized sheet to move through the bath with one or more rollers supplying current to the metallized sheet. With a current density of about 40 amperes per square foot of surface area of carrier undergoing, at any instant, treatment in the bath, and with a treatment time between 1 to 4 minutes, an alloy of: 65 to 80% cobalt, 2 to 3% phosphorus and the balance nickel is deposited on the metallized surface. The electroplated layer has a coercivity ($H_c$) of at least 375 oersteds, a residual induction ($B_r$) of at least 6000 gauss and a layer thickness between 2 to 20 microinches. By varying the electroplating parameters it is possible to obtain a magnetizable layer with a coercivity of at least 375 oersteds, a residual induction between 6000 to 14,500 gauss, and surface characterized by a roughness between 2 to 4 microinches peak to peak.

Metals other than nickel provide the necessary nuclei for bonding the magnetizable layer to the carrier. For example, aluminum, chromium, copper, silver and gold metallize the carrier with the required bonding nuclei. The metallizing is accomplished by a conventional method such as vacuum evaporation, cathode sputtering or chemical plating. The thickness of the metallized layer is usually maintained between 1.5 to 10 microinches.

Similarly, magnetizable metals such as cobalt, cobalt-phosphorus alloys, cobalt-sulfur alloys, cobalt-iron alloys, and cobalt-iron-nickel alloys provide a magnetic recording surface with the required characteristics. The magnetic recording surface may be formed from any ferromagnetic metal which has a coercivity of at least 375 oersteds and which provides a recording surface with a roughness between 2 to 4 microinches.

While the invention has been particularly shown and described with reference to preferred embodiments thereof, it will be understood by those skilled in the art that the foregoing and other changes in form and in detail may be made therein without departing from the spirit and scope of the invention.

I claim:

1. In a record carrier having a magnetic recording medium on the surface thereof for the storage of intelligence at high density, the combination of:

a carrier, said carrier being a dielectric resin sheet formed from the polymeric condensation product of terephthalic acid and ethylene glycol, a thin film of metal superimposed on said carrier surface, said metal providing nuclei for bonding a magnetizable metal thin film to the carrier surface with a firm fused metal-to-resin bond and said metal having a surface with a roughness between 2 to 4 microinches peak to peak; and a magnetic recording medium superimposed over and bonded to said thin film of metal, said magnetic recording medium being a metal film selected from the group consisting of cobalt and cobalt base alloys having a coercivity of at least 375 oersteds, a residual induction in the range between 6,000–14,500 gauss and recording surface with a roughness in the range between 2 to 4 microinches peak to peak.

2. A record carrier having a thin magnetic recording medium on the surface thereof for the storage of intelligence at high density, the combination of:

a carrier, said carrier being a flexible dielectric resin sheet;

a thin flexible metal bonding film superimposed over said surface of said dielectric resin sheet, said metal bonding film providing metal nuclei for bonding a magnetizable ferromagnetic continuous metal film to the carrier surface with a firm fused metal-to-resin bond; and, a magnetic recording medium formed from a ferromagnetic metal film selected from the group consisting of iron, cobalt and nickel, superimposed over and bonded to said metal nuclei, said magnetic recording medium being sufficiently thin to provide a high coercivity of at least 375 oersteds and, further, having a residual induction in the range between 6000 and 14,500 gauss and a recording surface with a roughness in the range between 2 to 4 microinches peak to peak.

3. A record carrier having a thin magnetic recording medium on the surface thereof for the storage of intelligence at high density, the combination of:

a carrier, said carrier being a flexible dielectric resin sheet;

a thin flexible metal bonding film superimposed on the surface of said dielectric resin sheet, said metal bonding film including a continuous metal film with a surface roughness in the order of 2 to 4 microinches peak to peak and providing metal nuclei for bonding a ferromagnetic metal film to the carrier surface with a firm fused metal-to-resin bond; and, a magnetic recording medium formed from a ferromagnetic metal film selected from the group consisting of iron, cobalt and nickel, superimposed over and bonded to said metal nuclei, said magnetic recording medium being sufficiently thin to provide a coercivity of at least 375 oersteds and further having a residual induction of at least 6000 gauss and a recording surface with a roughness in the range between 2 to 4 microinches peak to peak.

References Cited in the file of this patent

UNITED STATES PATENTS

| | | |
|---|---|---|
| 2,600,220 | Doelker | June 10, 1952 |
| 2,663,652 | Railing | Dec. 22, 1953 |
| 2,671,034 | Steinfeld | Mar. 2, 1954 |
| 2,700,212 | Flynn | Jan. 25, 1955 |
| 2,730,491 | Moline | Jan. 10, 1956 |
| 2,808,345 | Traub | Oct. 1, 1957 |
| 2,999,766 | Ashworth | Sept. 12, 1961 |
| 3,008,848 | Annonio | Nov. 14, 1961 |
| 3,013,919 | Bialy | Dec. 19, 1961 |
| 3,019,303 | Bauer | Jan. 30, 1962 |
| 3,052,567 | Gabor | Sept. 4, 1962 |

FOREIGN PATENTS

| | | |
|---|---|---|
| 670,993 | Great Britain | Apr. 30, 1952 |
| 832,333 | Germany | Feb. 25, 1952 |

OTHER REFERENCES

IBM Technical Disclosure Bulletin, "Preparation of Adherent Thin Magnetic Films by Chemical Reduction," vol. 2, No. 3, October 1959.

Electrolytic Polishing of Metallic Surfaces, by Dr. Pierre A, Jacquet, in "Metal Finishing," January 1950, pages 56–62.